United States Patent

Finestone et al.

[11] Patent Number: 5,565,252
[45] Date of Patent: Oct. 15, 1996

[54] FACING FOR WALL BOARD

[76] Inventors: Arnold B. Finestone, 2400 Presidential Way, West Palm Beach, Fla. 33401; Gilbert Bloch, 3349 S. Malo Ct., Palm Beach Gardens, Fla. 33410

[21] Appl. No.: 310,307

[22] Filed: Sep. 22, 1994

Related U.S. Application Data

[63] Continuation-in-part of Ser. No. 149,620, Nov. 9, 1993, which is a continuation-in-part of Ser. No. 57,963, May 4, 1993, which is a division of Ser. No. 818,544, Jan. 9, 1992, Pat. No. 5,244,702.

[51] Int. Cl.$^6$ .............................. B32B 7/12; B32B 15/08; E04C 1/00
[52] U.S. Cl. .................... 428/40.9; 428/344; 428/345; 428/354; 428/355; 428/511; 428/512; 428/537.5; 428/537.7; 428/904.4; 428/910; 52/309.3; 52/309.14; 52/309.17; 52/411
[58] Field of Search .................... 428/343, 344, 428/354, 345, 355, 507, 511, 512, 537.5, 703, 910, 537.7, 40, 904.4; 52/309.3, 309.14, 309.17, 411

[56] References Cited

U.S. PATENT DOCUMENTS

| | | | |
|---|---|---|---|
| 3,607,540 | 9/1971 | Hoogsteel | 156/289 |
| 4,096,013 | 6/1978 | Lutzmann et al. | 156/272 |
| 4,215,168 | 7/1980 | Yonemura et al. | 428/215 |
| 4,254,173 | 3/1981 | Peer, Jr. | 428/204 |
| 4,405,682 | 9/1983 | Fujita et al. | 428/317.7 |
| 4,749,625 | 6/1988 | Obayashi et al. | 425/624 |
| 4,895,747 | 1/1990 | Birkholz et al. | 428/42 |
| 5,441,784 | 8/1995 | Smith | 428/40 |

*Primary Examiner*—Marion E. McCamish
*Assistant Examiner*—Blaine R. Copenheaver
*Attorney, Agent, or Firm*—Michael Ebert

[57] ABSTRACT

A facing for wall board such as sheet rock, adapted to reinforce the board as well as to enhance its thermal barrier and acoustic characteristics. The facing is a laminate sheeting formed by a paper ply cold-laminated to a synthetic plastic oriented film ply, the opposing surfaces of the film ply being corona-discharge treated to render them receptive to adhesives. The exposed surface of the film ply is coated with a water moistenable adhesive, so that when this coating is moistened, the facing may then be adhered to the wall board to reinforce the board and to impart sound absorbing and decorative properties thereto. The film ply or the paper-ply in the facing is metalized to reflect infrared rays and thereby reduce the transfer of thermal energy through the board.

6 Claims, 1 Drawing Sheet

FACING FOR WALL BOARD

RELATED APPLICATIONS

This application is a continuation-in-part of our copending application Ser. No. 08/149,620 (pending), filed Nov. 9, 1993, entitled "Foraminated Paper-Plastic Laminate Sheeting," which in turn is a continuation-in-part of application Ser. No. 08/057,963 (pending), filed May 4, 1993 entitled "Paper-Plastic Laminate Sheeting," this being a division of application Ser. No. 07/818,544, filed Jan. 9, 1992, entitled "Paper-Plastic Laminate Sheeting" (now U.S. Pat. No. 5,244,702). The entire disclosures of these related applications are incorporated herein by reference.

BACKGROUND OF INVENTION

1. Field of Invention

This invention relates generally to a facing attachable to wall boards forming walls and ceilings of the rooms in office and residential buildings, and more particularly to a facing which acts to reinforce the wall board to which it is attached and to enhance its thermal barrier, acoustic and decorative characteristics.

2. Status of Prior Art

In the construction of office and residential buildings, it is now common practice to form walls and ceiling of their rooms by using wall boards for this purpose. These provide a so-called hollow wall structure in which there exists a free space or hollow behind the wall boards. Wall boards are made of various materials including plywood and asbestos cement sheet. The most widely used material is known as sheet rock, for this relatively inexpensive board is composed of a layer of gypsum sandwiched between two sheets of heavy paper.

Sheet rock, though relatively weak, has many practical advantages, for it is easy to install and its exposed paper surface may be painted or have wallpaper adhered thereto. And sheet rock is easily repaired, for if holes are bored therein to receive anchors for mounting fixtures or other objects on the wall board, when the anchors are later removed, the exposed holes may be filled with spackle.

However, sheet rock also has serious drawbacks, for this material is easily gouged in that its paper and gypsum constituents offer little resistance to scoring. And sheet rock has only fair thermal barrier properties, and in a heated room whose wall and ceiling surfaces are defined by sheet rock, there is a gradual loss of heat by reason of heat transfer through the sheet rock. Sheet rock tends to reflect sound, for its gypsum core is not sound absorbent; hence it is often necessary when a ceiling is formed of sheet rock to attach sound absorbing acoustic tiles thereto.

Since a facing for a wall board is formed from a paper-plastic film laminate, of prior art background interest are the patents to Peer U.S. Pat. No. 4,254,173 and Jensen, U.S. Pat. No. 4,549,917 which disclose such laminates, but lack the properties of a facing in accordance with the invention.

The advantage gained by covering a sheet rock wall with wallpaper is that the paper serves to adorn the wall, for wallpaper usually has printed thereon a multi-colored decorative pattern or attractive graphics. And since wallpaper is applied to a wall by first coating the inner surface thereof with a water-soluble adhesive, when the wallpaper becomes soiled or when one wishes to replace it with a wallpaper having a pattern, it is a relatively simple matter to remoisten and soften the adhesive underlying the wallpaper in order to strip it from the wall.

However, a conventional wallpaper is lacking in strength and does not act to significantly reinforce a sheet rock wall or to act as a moisture, acoustic or thermal barrier and thereby enhance the properties of the wall.

SUMMARY OF INVENTION

In view of the foregoing, the main object of this invention is to provide a facing for a wall board which acts to improve the structural, thermal and acoustic properties of the wall board to which it is attached.

More particularly an object of this invention is to provide a facing for a wall board which is a paper-plastic film laminate that when combined with a standard wall board such as sheet rock, not only reinforces the wall board but also enhances its thermal barrier and sound absorbing characteristics.

Also an object of the invention is to provide a system for efficiently manufacture a facing in accordance with the invention.

A significant advantage of a facing in accordance with the invention is that it acts as a decorative wallpaper which is adhered to the wall board and which is strinppable therefrom without impairing the surface of the wall board.

Briefly stated, this objects are attained by a facing for wall board such as sheet rock, adapted to reinforce the board as well as to enhance its thermal barrier and acoustic characteristics. The facing is a laminate sheeting formed by a paper ply cold-laminated to a synthetic plastic oriented film ply, the opposing surfaces of the film ply being corona-discharge treated to render them receptive to adhesives. The exposed surface of the film play is coated with a water-moistenable adhesive, so that when this coating is moistened, the facing may then be adhered to the wall board to reinforce the board and to impart sound absorbing properties thereto. The film ply or the paper ply in the facing is metalized to reflect infrared rays and thereby reduce the transfer of thermal energy through the board.

BRIEF DESCRIPTION OF DRAWINGS

For a better understanding of the invention, reference is made to the detailed description to be read in conjunction with the drawing wherein.

DESCRIPTION OF INVENTION

The Facing

Figure 1:
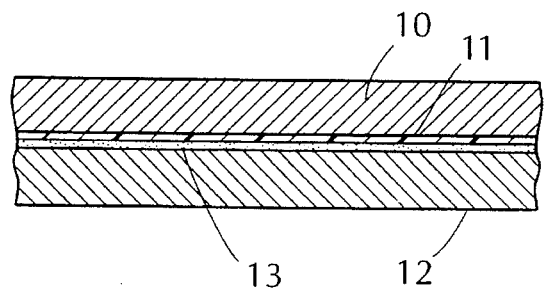
FIG. 1 is a section taken through a wall board having attached thereto a facing in accordance with the invention.
Figure 2:
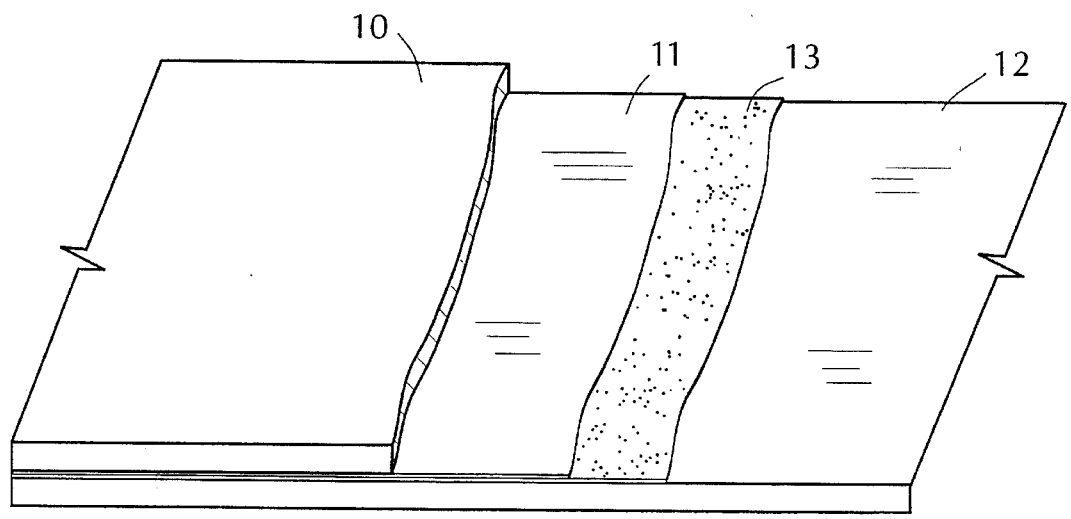
FIG. 2 is an enlarged sectional view of the facing.

Referring now to FIGS. 1 and 2, facing F in accordance with the invention includes a face ply 10 formed of high-strength paper sheeting. Face ply 10 is cold laminated by an adhesive layer 11 to a base ply 12 of high-strength, synthetic plastic film, such as polyethylene. Preferably the film is formed of a biaxially-oriented material, such as polypropylene or polyester (MYLAR). The opposing film surfaces of the base ply are rendered wettable by corona-discharge treatment so that they are wettable and receptive to adhesives. Either the outer surface of the film ply or that of the paper ply is metalized.

Metallization of the film ply is effected by vaporization or by sputtering a metal such as aluminum on the film surface to form thereon a coating of molecular thickness that does not affect the orientation of the film or otherwise change its structural properties.

Coated on the exposed wettable surface of base ply 12 is a re-moistenable adhesive layer 13, so that the facing can be adhered to a wall board B. Suitable for this purpose is a water-activated starch adhesive. Thus the facing acts as a decorative wallpaper which like a conventional wallpaper can be stripped off the wall board without impairing its surface. The paper ply of the facing may be decorated in the manner of conventional wallpaper.

The plastic film base ply 12 is preferably no more than two mils in thickness; hence, by itself, it lacks rigidity and body. The paper face ply 10 is thicker, being preferably 2 or 3 mils thick, but no greater than 5 mils thereby imparting a measure of stiffness and body to the facing.

When film ply 12 is biaxially-oriented, it has exceptional tensile strength, such orientation being effected by stretching the film along both its transverse and horizontal axes to molecularly orient the structure of the film. The strength of the paper face ply, alone, is not high, but the paper-film laminate forming facing F has both body and high strength.

Cold lamination of the plies is effected by a water-based adhesive, preferably a polyacrylic copolymer composition having an affinity both for the paper ply and the film ply. Because the water-based adhesive is fluid at ambient temperature and is not a hot melt adhesive, no heat is applied to the biaxially-oriented film as it is being laminated to the paper ply. By water-based adhesive is meant an adhesive which when cured cannot thereafter be reactivated by water. Also useable is a polyvinyl acetate copolymer.

It is important to bear in mind that a biaxially oriented film is heat-sensitive and that at elevated temperatures, the film relaxes and loses its molecular orientation and strength. It is known, for example, that when two sheets of biaxially-oriented polyester film are seamed together, using an ultrasonically-activated sealing bar for this purpose which creates internal friction and heat within the film and causes the superposed films to soften and fuse, the resultant sealing line is weak, and the sheets then tend to tear along this line. Cold lamination is, therefore, essential to the present invention in order to produce a facing of high strength.

The re-moistenable, water-soluble adhesive coating 13 on the exposed surface of plastic film base ply 10 is preferably a water-based starch, an animal glue, or acrylic composition, or of any other composition conventionally used in gumming tape.

It is to be noted that a synthetic plastic film material, such as polypropylene, is normally not receptive to adhesives, especially water-based adhesives. Hence if one were to apply to the surface of this film a water-based adhesive which is flowable at ambient temperature or at a temperature somewhat above ambient but not at the elevated temperature of a hot melt adhesive, the adhesive will not be adsorbed by the film. Essential to the invention is that the opposing surfaces of the film forming the base ply of the facing be treated so as to render them wettable and hence receptive to adhesives. To this end, these surfaces are subjected to a corona discharge treatment which enhances their surface energy, as measured in dynes, and thereby renders them wettable to allow for better bonding of adhesives applied thereto.

Wall board B, in the example shown, is a panel of sheet rock formed by a gypsum layer 14 sandwiched between inner and outer paper sheets 15 and 16.

To attach facing F to the wall board B, it is only necessary to moisten with water the re-moistenable adhesive layer 13 coating the film ply, using a brush or roller for this purpose. Since the water is not absorbed by the plastic film, the adhesive remains moist for a relatively long period, sufficient to permit the facing after it is moistened, to be pressed against the paper sheet 16 of the sheet rock and to adhere thereto. To this end a hand-held roller may be used to press the facing against the wall board and to smooth the facing so that it is uniformly applied to the board so as to exclude air bubbles.

When attached to the wall board, facing F then acts to reinforce the wall board and to render it resistant to gouging or scoring, for the orientated film ply included in the facing is not easily penetrated. And the exposed paper ply of the facing may be painted or have wallpaper adhered thereto. Or the exposed paper ply may be decoratively printed so that the facing on the wall board acts also as a decorative wallpaper.

The facing F, when adhered to the paper sheet 16 of the sheet rock then forms a three-ply laminate, in which film ply 12 is sandwiched between paper sheet 16 of the sheet rock panel facing paper sheet 10. This sandwich acts to acoustically cushion the gypsum layer 14 of the sheet rock and to absorb ambient sound in the room in which the wall board B is installed. And the metallized film on the paper or film ply of facing F acts to reflect infrared rays impinging on the wall board, so that when room 18 is heated, little heat transfer takes place through the wall board, even though paper and gypsum are somewhat permeable to infrared energy. Hence facing F in combination the wall board B acts as a thermal barrier.

The Manufacturing System

Figure 3:
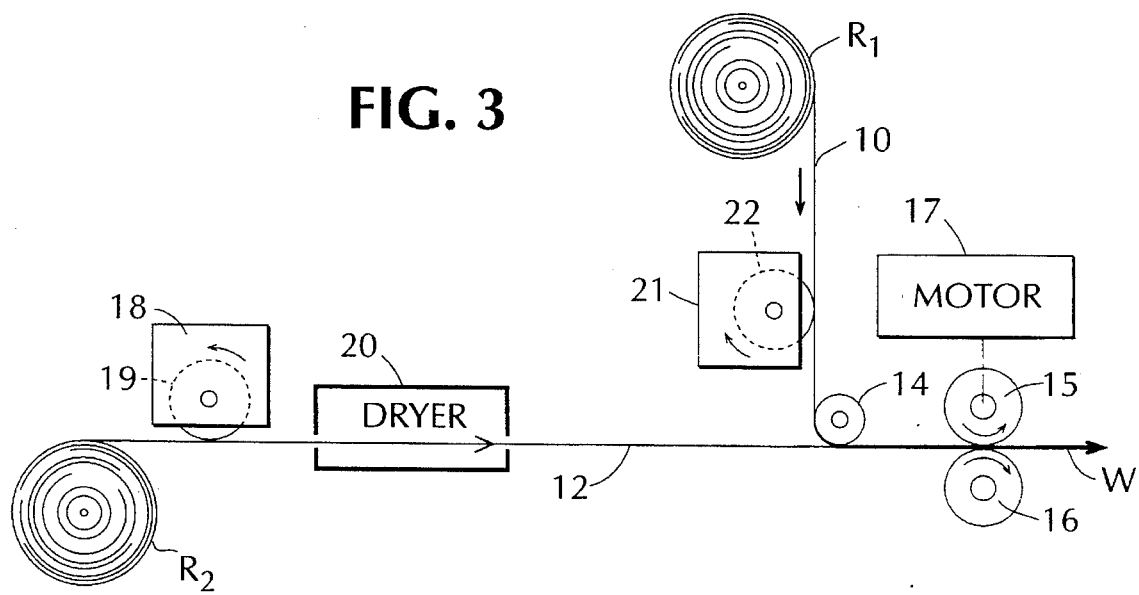
FIG. 3 shows a single stage system for manufacturing the facing.

FIG. 3 schematically illustrates a single-stage system for producing a paper-plastic facing F in accordance with the invention. The system include a combining station having a pair of cooperating pressure rolls 19 and 20, driven at high speed by a motor M. The nip between these rolls is appropriate to the thickness of the webs to be laminated to provide the desired degree of laminating pressure to ensure secure bonding of the webs.

Fed concurrently into the nip of rolls 19 and 20 at the combining station are a web 21 of paper for forming the paper face ply 10 of the facing, and a web 22 of synthetic, plastic film material to form the base ply 12 of the facing. Web 21 is drawn from a paper supply reel 23 supported at an elevated position. Paper web 21 is drawn downwardly from this reel and is guided by an idler roll 24 into a horizontal path leading into the nip of the combining rolls.

Film web 25 is drawn from a film supply reel 26 which is placed at a position to feed film web 25 directly into a horizontal path toward the nip of the combining rolls. Reel 26 is placed well in advance of the combining station in order to expose a fairly long stretch of film web before it enters the combining rolls.

Along this stretch of biaxially-oriented metallized film web 25 formed of a synthetic plastic material such as polypropylene having a high dielectric constant, is a first corona discharge electrode 26 which is spaced above the upper surface of the film to create an ionizable air gap therebetween. The film web runs along a ground electrode 26G in vertical alignment with discharge electrode 26. The corona discharge, which is directed toward the upper surface of the film web, increases the surface energy at the web surface to render it wettable and, therefore, receptive to adhesives, but it does not affect the molecular orientation of the film.

Also along the stretch of film following the first corona discharge station 26–26G is a second corona discharge station for subjecting the undersurface of film web 25 to a corona discharge to render this surface wettable so that it is receptive to an adhesive to be later applied thereto. The second station consists of a corona discharge electrode 27 which is spaced from the undersurface of web 25 to create an air gap therebetween, and a cooperating ground electrode 27G engaging the upper surface of the web.

Intermediate the second corona discharge station 23–23G and the combining station is a first adhesive applicator 28 having a coating roll 29 which engages the now wettable upper surface of film web 18 and applies thereto the water-based, acrylic polymer adhesive for cold-laminating the film web to the paper web to form the laminating adhesive layer 11 of the facing.

Thus concurrently entering the nip of pressure rolls 19 and 20 of the combining station at ambient temperature are paper web 21 and the adhesive-coated film web 25. These webs are subjected to pressure by pressure rolls 19 and 20, cold-lamination being effected by this action. The laminated webs from the combining station are wound on an output reel 30 driven by motor M, whose operation is synchronized with motor M driving the pressure rolls, for these motors together serve to draw the webs from their supply reels.

Output reel 30 is so spaced from the combining station as to provide a fairly long stretch sufficient to permit drying of the adhesives applied to the webs. In this stretch, placed below plastic film web 25 is an applicator 31 whose coating roll 32 engage the now wettable undersurface of film web 18 to coat this surface with the re-moistenable adhesive forming the re-moistenable adhesive layer 13 on the plastic film underside of facing F.

Thus, wound on output reel 26 are the laminated paper and film webs, the exposed surface of the film web having a moistenable adhesive coating thereon. In practice, forced air dryers may be provided at positions following the combining station and following adhesive applicator 30 to fully dry the adhesives before the laminated webs are wound onto the output reel. And while the forced air is heated, the temperature thereof is well below and elevated temperature that would impair the biaxial orientation of the film.

In practice, the width of the paper and film webs in the laminator may correspond to the width of a standard wallpaper, so that the facing may be applied to the wall board in the same manner as wallpaper is conventionally applied thereto.

While there has been shown a preferred embodiment of the invention, it will be appreciated that many changes may be made therein without departing from the spirit of the invention.

We claim:

1. A reinforcing facing attached to an outer paper surface of a wall board to create the ceiling and wall surfaces of a room, in which the facing in combination with the board affords enhanced thermal barrier and sound absorbing characteristics, said facing comprising:

A. a paper ply having an inner surface and an outer surface;

B. a reinforcing ply formed of oriented heat-sensitive synthetic plastic film, the film ply having an inner surface and an outer surface both of which are corona-discharge treated to render them receptive to adhesives;

C. a water-based adhesive cold laminating the inner surface of the film ply to the inner surface of the paper ply whereby the orientation of the film ply is retained to produce a laminate sheeting of high strength;

D. a remoistenable adhesive coating the outer surface of the film ply whereby when this coating is moistened is then attached to the outer paper surface of wall board to produce a sandwich laminate in which the film ply is sandwiched between the paper ply and the outer paper surface of the board to render the combined facing and board effective as a thermal barrier in the room and to absorb sound; and E. a metallic coating on the outer surface of the paper ply or the inner surface of the film ply to reflect infrared rays impinging on the facing and thereby reduce transfer of thermal energy through the board.

2. A facing as set forth in claim 1, in which said film is bi-axially oriented.

3. A facing as set forth in claim 1, in which the water-based adhesive is a polyacrylate copolymer.

4. A facing as set forth in claim 1, in which the water-based adhesive is a polyvinyl acetate copolymer.

5. A facing as set forth in claim 1, in which the film is of a material selected from the class consisting of polypropylene, nylon, polyethylene and polyester.

6. A facing as set forth in claim 1, in which the re-moistenable adhesive is a starch composition.

\* \* \* \* \*